No. 658,086. Patented Sept. 18, 1900.
C. A. HIGBEE.
SCREW COUPLING.
(Application filed Jan. 4, 1900.)

(No Model.)

Witnesses: Inventor: Clinton A. Higbee by his atty.

UNITED STATES PATENT OFFICE.

CLINTON A. HIGBEE, OF PHILADELPHIA, PENNSYLVANIA.

SCREW-COUPLING.

SPECIFICATION forming part of Letters Patent No. 658,086, dated September 18, 1900.

Application filed January 4, 1900. Serial No. 322. (No model.)

*To all whom it may concern:*

Be it known that I, CLINTON A. HIGBEE, a citizen of the United States of America, residing in the city and county of Philadelphia, in the State of Pennsylvania, have invented a certain new and useful Improvement in Screw-Couplings, of which the following is a true and exact description, reference being had to the accompanying drawings, which form a part thereof.

My invention relates to screw-couplings, and particularly though not exclusively to such screw-couplings as can be described as or similar to a bolt and nut, the special objects of my invention being, first, to provide for a screw-coupling which will be self-locking, inasmuch as it is less likely than ordinary couplings to come loose in the ordinary exigencies of use, and, secondly, to provide for a jamming union between two members of the screw-coupling, such as is described and shown in my former patent, No. 597,000, of January 11, 1898, between the members of the coupling which have also the ordinary bearing and engagement with each other which is afforded in ordinary screw-coupling members, the threads of which are formed on cylindrical surfaces. This is advantageous in some cases where a prolonged engagement between the members is desirable.

With the above objects in view my invention consists, broadly speaking, in forming the male and female members of the coupling with the portions of their threads which are first engaged in screwing them together formed upon cylindrical surfaces and so as to engage and turn freely without jamming and in providing one of the coupling members with a continuation of its thread of the same pitch, but formed on a conical surface, so as to make a jamming union or engagement with the cylindrical thread of the other member, the threads of the coupling, at least in the portions where the jamming union is to be formed, being of such conformation as to leave a clearance between their tops and bottoms when engaged, into which the metal of the threads can flow under the pressure exerted upon them in screwing the members together.

Figure 2:
Figure 5:
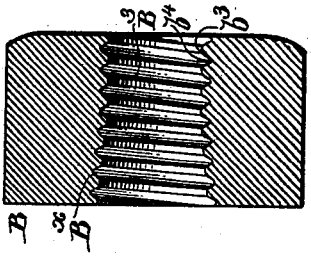
Figure 1:
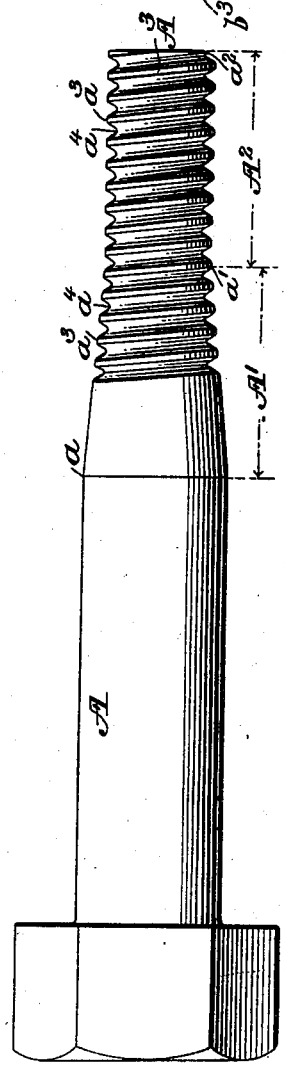
Figure 3:
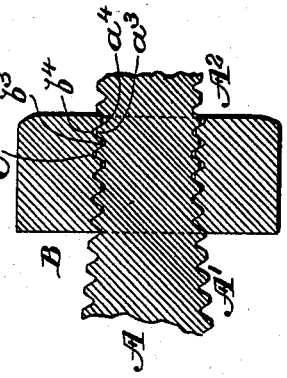
Figure 4:
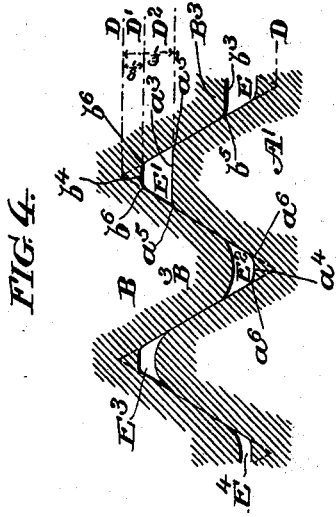

Reference being now had to the drawings in which my invention is illustrated, Figure 1 is an elevation of a bolt, and Fig. 2 of a nut, forming a screw-coupling embodying my invention, the nut being shown in section. Fig. 3 is a longitudinal central section through the coupled bolt and nut. Fig. 4 is an enlarged section through a portion of the coupled threads, and Fig. 5 indicates a slight modification.

A indicates the bolt, which is threaded through the portions indicated at $A'$ and $A^2$, the threaded portion $A'$ being of conical shape and the threaded portion $A^2$ being of cylindrical shape.

$A^3$ indicates the thread, which is of uniform pitch throughout, though of gradually-increasing diameter through the portion $A'$.

B indicates the nut or female member of the coupling, the threaded portion of which is of cylindrical form, $B^3$ indicating the thread which is formed to fit with ordinary nicety upon the threaded portion $A^2$ of the bolt or male coupling member.

It is of course necessary that the tops and bottoms of the thread should be so formed that when coupled together and until the form of the thread is altered under stress the tops and bottoms of the coupled threads should clear each other, leaving an open space into which the metal of the threads can flow when sufficient power is exerted, and preferably I form the threads with squared tops and bottoms, with their corner edges where they join the angular sides of the threads slightly rounded and with their tops considerably broader than their bottoms, as is best shown in Fig. 4, where $a^3$ indicates the squared top of the thread $A^3$ and $a^4$ the squared bottom of the thread $A^3$, $a^5$ indicating the rounded corners of the top and $a^6$ the rounded corners of the bottom. The squared tops of the female thread $B^3$ are indicated at $b^3$ and the squared bottoms at $b^4$, and the rounded corners of the top at $b^5$ and the rounded corners of the bottom at $b^6$, E E', &c., indicating the clearance between the tops and bottoms of the coupled threads, the normal clearance being shown at E, while the gradual filling up of the clearance due to the flow of the metal of the threads is indicated at E', $E^2$, and $E^3$.

The distance between the lines D D indicates the height of a strictly V-shaped thread the sides of which have the angular inclination of the threads A³ or B³, and I may state that the best proportion which I have employed between the squared tops and bottoms of the threads is secured by forming the squared bottom of the thread as indicated by the distance between D and D', Fig. 4, and by forming the squared top of the thread at a distance from the theoretical apex of from one-third to one-quarter of the total height of the thread, as indicated at D' D², (here shown as one-third of the height of the thread.)

The specifical conformation of the threads as shown and hereinabove described forms the subject-matter of my other application for Letters Patent filed January 4, 1900, Serial No. 323, and is not, therefore, specifically claimed in the present case.

The special construction of a screw-coupling the male and female members of which have their threads formed on cylindrical surfaces, so as to engage and turn freely the one on the other, but in which the form of the threads are such as to leave a clearance between their tops and bottoms when coupled together—as, for instance, is the case in the union formed between the nut B and the portion A² of the bolt A—is also a novelty and forms the subject-matter of my other application for Letters Patent filed January 4, 1900, Serial No. 321, my present invention being, as hereinabove stated, confined to the feature of construction in which the coupling is provided with a member having its thread formed partly on a cylindrical and partly on a conical surface. When my coupling is in use, the nut or female member B screws freely upon the cylindrical portion A² of the bolt or male member; but when the nut is screwed up sufficiently far to engage with the thread on the conical portion A' the cylindrical thread of the nut at once jams in the conical thread of the bolt, and as further power is exerted to drive the nut higher on the bolt the metal of the engaged threads is forced to flow outward into the clearance afforded by the tops and bottoms of the coupled threads. The effect of this distortion of the coupled threads is to effect an ideally-perfect union and contact between the sides of the threads, the pressure being distributed with great uniformity on both faces of contact, which is not the case with threads of ordinary construction and which has the practical effect of substantially locking the two members of the coupling together in such a manner that in the ordinary exigencies of use there is little or no tendency to come unscrewed. If the nut is screwed up upon the conical portion of the bolt to a sufficient extent, the flow of metal in the upper threads is sufficient to entirely close the clearance left between the tops and bottoms of the thread and to close it with a perfection which is unattainable in threads of ordinary construction; but for the purpose of locking the members together, as above described, it is not necessary that the distortion of the thread should go to this extent. If desired, the portion of the thread of the nut which comes first in contact with the conical portion of the thread of the bolt may be also made on an outwardly-flaring conical surface, as shown at B<sup>×</sup> in Fig. 5. This obviously will not interfere with the described action of the threads and in some cases will be advantageous.

Having now described my invention, what I claim as new, and desire to secure by Letters Patent, is—

1. A screw-coupling consisting of male and female members each having the portions of their threads which are first interengaged formed on cylindrical surfaces to engage freely and without jamming and one coupling member having a continuation of its thread formed on a conical surface and so as to form a jamming engagement with the threads of the other member, the threads of the coupling members which engage in a jamming union as aforesaid being so formed as to leave a clearance between their tops and the bottoms of the engaged threads which permits of and is closed or partly closed up by a flow of the metal of the thread as the members are screwed together.

2. A screw-coupling consisting of male and female members each having the portions of their threads which are first interengaged formed on cylindrical surfaces to engage freely and without jamming and the male coupling member having a continuation of its thread formed on an outwardly-flaring conical surface so as to form a jamming union with the cylindrical or more nearly cylindrical thread of the female member, the threads of both members being so formed as to leave a clearance between their tops and the bottoms of engaged threads which permits of and is partly or wholly closed up by the flow of the metal of the threads where they form a jamming engagement.

3. A bolt and nut in which the thread of the bolt is formed partly on a cylindrical surface and partly on a conical surface and the thread of the nut on a cylindrical surface and so as to fit upon the cylindrical portion of the bolt and in which the threads of both bolt and nut are formed to engage with a clearance between their tops and the bottoms of engaged threads which clearance permits of and is partly or wholly closed up by the flow of the metal of the threads where the nut forms a jamming union with the conical thread of the bolt.

CLINTON A. HIGBEE.

Witnesses:
CHAS. F. MYERS,
D. STEWART.